United States Patent
Clapper et al.

(10) Patent No.: US 10,221,636 B2
(45) Date of Patent: Mar. 5, 2019

(54) POLYMER-MODIFIED ASPHALT FOR DRILLING FLUID APPLICATIONS

(71) Applicant: BAKER HUGHES INCORPORATED, Houston, TX (US)

(72) Inventors: Dennis K. Clapper, Houston, TX (US); Ian L. Everhard, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/448,241

(22) Filed: Mar. 2, 2017

(65) Prior Publication Data

US 2018/0251666 A1    Sep. 6, 2018

(51) Int. Cl.
| | |
|---|---|
| E21B 21/00 | (2006.01) |
| C09K 8/035 | (2006.01) |
| C09K 8/32 | (2006.01) |
| C09K 8/04 | (2006.01) |
| C09K 8/502 | (2006.01) |
| C09K 8/508 | (2006.01) |

(52) U.S. Cl.
CPC ........... *E21B 21/003* (2013.01); *C09K 8/035* (2013.01); *C09K 8/04* (2013.01); *C09K 8/32* (2013.01); *C09K 8/502* (2013.01); *C09K 8/508* (2013.01)

(58) Field of Classification Search
None
See application file for complete search history.

(56) References Cited

U.S. PATENT DOCUMENTS

| | | | | |
|---|---|---|---|---|
| 3,251,769 | A * | 5/1966 | Brewster | C09K 8/32 507/117 |
| 3,577,249 | A * | 5/1971 | Dybalski | C08K 5/17 106/269 |
| 6,547,710 | B1 * | 4/2003 | Patel | C08C 19/04 525/332.8 |
| 7,576,039 | B2 | 8/2009 | Huber et al. | |
| 8,076,399 | B2 * | 12/2011 | Laurens | C08L 91/00 524/272 |

(Continued)

FOREIGN PATENT DOCUMENTS

WO    WO-2017088892 A1 *   6/2017  ............... C08L 9/00

OTHER PUBLICATIONS

AkzoNobel, Bitumen Emulsion, AlczoNobel Technical Bulletin (2010), 1-22.

(Continued)

*Primary Examiner* — Anuradha Ahuja
(74) *Attorney, Agent, or Firm* — Mossman, Kumar, & Tyler, P.C.

(57) ABSTRACT

Polymer-modified asphalt is used in drilling fluids for filtration control, lost circulation control, drill string differential sticking prevention, or wellbore stabilization. The latex modified asphalt provides a mixture of latex-asphalt complex, asphalt, and latex particles that help maintain wellbore stability while drilling into shale formations. The polymer-modified latex is effective for controlling laminated and microfractured shale. Polymers may be functionalized to react with the asphalt to create copolymer modifications of the asphalt for improved performance as drilling fluid additives. The drilling fluids may be water-based or oil-based, or based on an emulsion of oil and water.

16 Claims, 2 Drawing Sheets

(56) References Cited

U.S. PATENT DOCUMENTS

| | | | |
|---|---|---|---|
| 8,821,064 B1* | 9/2014 | Morris | C08L 95/005 |
| | | | 404/17 |
| 2006/0163114 A1* | 7/2006 | D'Orazio Pessia | C10G 53/02 |
| | | | 208/39 |
| 2006/0166833 A1* | 7/2006 | Huber | C09K 8/035 |
| | | | 507/126 |
| 2010/0193244 A1* | 8/2010 | Hoskins | C09K 8/035 |
| | | | 175/5 |
| 2017/0107376 A1* | 4/2017 | Winship | C08L 95/005 |

OTHER PUBLICATIONS

King, Gayle, J. J. Polymer Modified Asphalt Emulsions Compositions, Uses, and Specifications for Surface Treatments, Lakewood, CO: Federal Highway Administration (2009).

James, A., Overview of Asphalt Emulsion, Transportation Research Circular (Aug. 2006), pp. 1-15.

Peterson, J. C., A Review of the Fundamentals of Asphalt Oxidation, Physiochemical, Physical Property, and Durability Relationships, Transportation Research Circular E-C140 (Oct. 2009), pp. 1-9.

Becker, Yvonne M. P., Polymer Modified Asphalt, Vision Technologiva, vol. 9 N° 1,(2001), p. 39-50.

* cited by examiner

POLYMER-MODIFIED ASPHALT FOR DRILLING FLUID APPLICATIONS

TECHNICAL FIELD

The present invention relates to methods for drilling through subterranean formations using drilling fluids, and more particularly relates, in one non-limiting embodiment, to methods for drilling through subterranean formations using drilling fluids containing asphalt.

BACKGROUND

Drilling fluids used in the drilling of subterranean oil and gas wells along with other drilling fluid applications and drilling procedures are well known. In rotary drilling there are a variety of functions and characteristics that are expected of drilling fluids, also known as drilling muds, or simply "muds". The functions of a drilling fluid include, but are not necessarily limited to, cooling and lubricating the bit, lubricating the drill pipe and other downhole equipment, carrying the cuttings and other materials from the hole to the surface, and exerting a hydrostatic pressure against the borehole wall to prevent the flow of fluids from the surrounding formation into the borehole.

Drilling fluids are typically classified according to their base fluid. In water-based muds, solid particles are suspended in water or brine. Oil can be emulsified in the water which is the continuous phase. Brine-based drilling fluids, of course are a water-based mud (WBM) in which the aqueous component is brine. Oil-based muds (OBM) are the opposite or inverse. Solid particles are suspended in oil, and water or brine is emulsified in the oil and therefore the oil is the continuous phase. Oil-based muds can be either all-oil based or water-in-oil macroemulsions, which are also called invert emulsions. In oil-based mud, the oil may consist of any oil that may include, but is not limited to, diesel, mineral oil, esters, or alpha-olefins.

The use of asphalt and derivatized asphalt in both oil-based and water-based drilling fluids is well established. Asphalt is used in drilling fluids to improve filtration control, improve lost circulation control, prevent drill string differential sticking, to stabilize the wellbore, and/or to control seepage loss into laminated or microfractured shale by means of bridging and sealing the microfractures at the wellbore interface. Although asphalt can be used in oil-based drilling fluids without modification, it is necessary to change the wetting and dispersing properties of asphalt in order to make the material dispersible and somewhat soluble in aqueous fluids. Two common approaches to improve the water dispersibility/solubility of asphalt are 1) surfactant addition and 2) sulfonation. Both types of modified asphalt are currently used in water-based drilling fluids. As used herein, asphaltite refers to any of various bitumens containing asphaltenes.

It would be desirable if compositions and methods could be devised to aid and improve the introduction of asphalts into drilling fluids beyond the techniques already known to give more choices to drilling operators.

SUMMARY

There is provided, in one non-limiting form, a method of drilling through a subterranean formation including drilling through a subterranean formation with a drilling fluid having a base fluid selected from the group consisting of water-based fluids, oil-based fluids, and combinations thereof, and a polymer-modified asphalt dispersed in the water which in turn includes particulate asphalt and a polymer latex.

DETAILED DESCRIPTION

Figure 1:
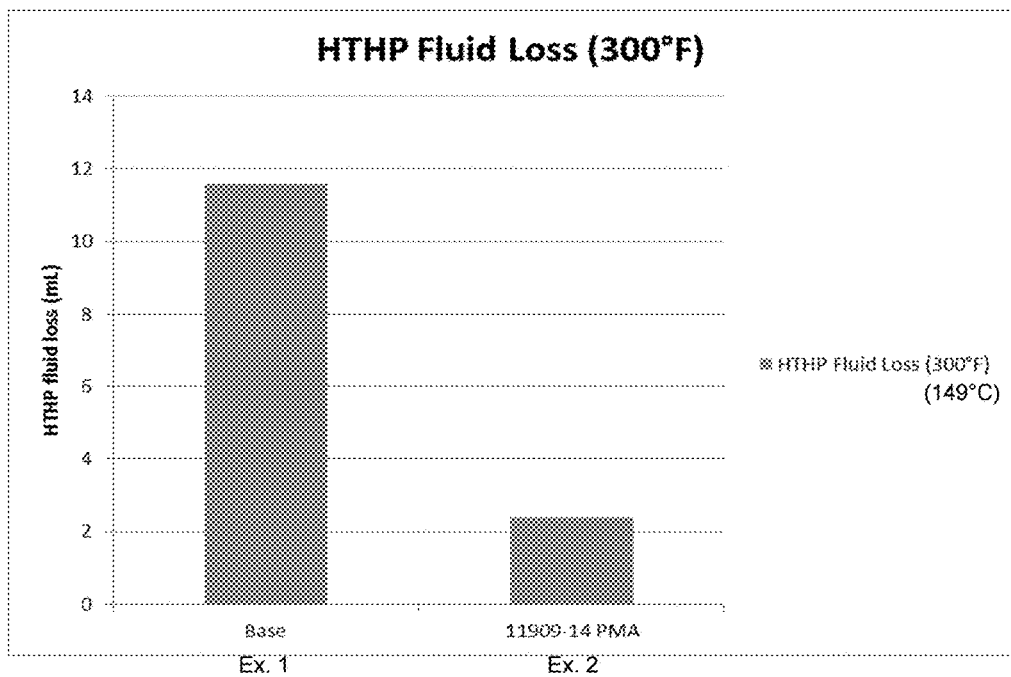
FIG. 1 is a graph comparing the high temperature, high pressure (HTHP) fluid loss of a base fluid with a polymer-modified asphalt at 500 pounds per square inch differential pressure (psid) (3.4 MPa) and 300° F. (149° C.)

It has been discovered that the dispersibility of asphalt in drilling fluids is improved by the incorporation of a polymer, such as a latex, during the asphalt emulsion manufacturing to produce an emulsion that includes mostly a suspension of asphalt particles and a relatively small amount of latex particles. This discovery is applicable to water-based fluids, oil-based fluids, and mixtures thereof, such as emulsions, but also other water and oil combinations. In one non-limiting embodiment, the asphalt emulsion would then be precipitated by the addition of a precipitating agent that may be a salt or an organic liquid. The precipitated asphalt/latex complex would then be dried and milled to a fine powder to produce a new type of water-dispersible asphalt that can be easily incorporated into a water-based drilling fluid, in one non-limiting example. Polymer-modified asphalt (PMA) per se is well known, but only for much different applications than as a drilling fluid additive; for instance in paving or road applications or in housing construction. It is not at all apparent from paving or road and/or housing applications that polymer-modified asphalt would have any applicability whatsoever in drilling fluids.

There are several ways to generate a polymer-modified asphalt product that could be used for drilling fluid applications. One could be an asphalt in water emulsion; another could be a precipitated product as described above; another could be a product that is made by simply heating the asphalt to the point that it is a liquid and stirring in the polymer at high shear. In this latter method one would also obtain a dry product once the mixture cools which could then be ground into a powder. Having the polymer-modified asphalt in a powder form would increase its ease of handling and, potentially prolong its storage life.

Synthetic latex is a thermoset elastomer, which consists of a mixture of polymer particles dispersed in water. Commonly used varieties of synthetic latex are styrene-butadiene rubber (SBR), polychloroprene (neoprene), and polybutadiene (PB). SBR latex can be easily added to asphalt emulsions during their production or after the asphalt emulsion (AE) has been made. Adding latex to an emulsion will result in two separate emulsions, one being the distinct polymer particles and the other being the much larger dispersed asphalt droplets. This system can be visualized by imagining relatively larger asphalt or bitumen droplets with latex droplets on or associated with the asphalt/bitumen droplets, all suspended in an aqueous phase. When a film is formed with this type of system, droplets containing latex coalesce along the surface of asphalt particles and form a continuous honey-combed polymer network around the asphalt. This effect is only seen with latex additions to an existing asphalt emulsion; in contrast polymer-modified asphalt can be emulsified which would result in a single dispersion phase of modified asphalt, which is more suitable for use in drilling fluids.

Pre-modification of asphalt is also possible where the solid asphalt material is modified using pellet forms of polymer and subsequently processed into an emulsion. This system can be visualized by imagining asphalt/bitumen droplets of varying sizes suspended in an aqueous phase where the polymer modifier is present within the asphalt/bitumen droplets. In this method, only one dispersed phase exists. Emulsification is limited by processing temperatures to the resulting softening point after modification with a polymer. The drilling fluids herein include both types of polymer-modified asphalt.

Polymers useful for incorporation into polymer-modified asphalt include, but are not necessarily limited to, polyethylene (PE), polypropylene (PP), ethylene-vinyl-acetate (EVA), ethylene-methacrylate (EMA), styrene-butadiene block copolymer (SBS), Zn-sulfonated-SBS, styrene-butadiene rubber (SBR), styrene-isoprene block copolymer (SIS), ethylene-propylene-diene-monomer (EPDM), epoxy resins, natural rubber, polybutadiene (PB), polyisoprene, reclaimed tire rubber, crumb rubber modifiers (CRM), acrylonitrile-butadiene-styrene (ABS), isoprene, reactive-ethylene-terpolymers (RET), polyvinyl chloride (PVC), ethylene-acrylate copolymer, acrylates, ethyl-methacrylate (EMA), ethyl-butyl-acrylate (EBA), butyl rubber, polychloroprene, polybutadiene, styrene-ethylene/butylene-styrene (SEBS), polychloroprene (also known as neoprene), natural rubber latex (NRL), ELVALOY® ethylene/glycidyl/acrylate (EGA) available from DuPont, and combinations thereof. The type of polymer that is used may vary with the particular application.

The polymers described above are meant to be physically dispersed into asphalt but do not necessarily chemically react with it. The polymers may be functionalized to thereby produce a chemical bond with the components of the asphalt to create copolymer modifications of the asphalt for improved performance. Reactive polymers have typically been used to increase the stability of the compounded product. Functionalization may include blending the polymer with a fatty dialkyl amide that contains a functional group that reacts with asphalt. Suitable functional groups include, but are not necessarily limited to, maleic anhydride, epoxy rings, esters such as methyl-, ethyl- or butyl-acrylates, carboxylates, and combinations thereof. In a non-limiting specific example, the polymer may be reacted with maleic anhydride to maleate the polymer. Alternatively, the polymer can be react with a sulfonate to sulfonate the polymer; suitable sulfonates include, but are not necessarily limited to, polystyrene sulfonates, sulfonated polyether sulfone, and copolymers containing 2-acrylamido-2-methylpropane sulfonic acid monomer and combinations thereof. In another non-limiting embodiment, functionalization can occur by copolymerizing the polymer with a polyethylene containing epoxy rings. Combinations of these functionalizations may also be used. The functionalized polymer latex has increased dispersability as compared with a polymer latex that is not functionalized. Other examples of functionalized polymers include maleated styrene-ethylene/butylene-styrene (SEBS-g-MAH) and Zn-sulfonated-SBS. The idea of using functionalized/reactive modifiers for use in drilling fluids additives is intriguing when the possibilities are considered for imparting water dispersability and an overall anionic charge for the benefit of stabilizing shale microfractures and clay hydration inhibition.

With respect to proportions, both emulsions and solid processed material should be considered and the proportions may be different for each type. In the case of an emulsion of polymer-modified asphalt particles, the proportion of particulate asphalt to polymer latex ranges from about 40 wt % independently to about 75 wt % asphalt and about 1.5 wt % independently to about 15 wt % polymer. In the case of emulsions, the balance is water and surfactant. Alternatively, the proportions may range from about 55 wt % independently to about 65 wt % asphalt with from about 5 wt % independently to about 10 wt % polymer addition. When the term "independently" is used herein with respect to a range, any endpoint may be used with any other endpoint to give a suitable alternative range. For instance, in this case the particulate asphalt can range from about 40 wt % to about 65 wt %.

In the case of polymer-modified asphalt emulsions, a suitable particle size distribution of the polymer-modified asphalt particles in the emulsion is d50 of from about 0.100 independently to about 100 microns; alternatively a d50 of from about 0.100 independently to about 20 microns.

With respect to solid processed polymer-modified asphalt, briefly, in one non-limiting embodiment, the solid processed polymer modified asphalt is made by a process including melting a solid asphalt, shearing the melted asphalt while adding dry polymer particles to give an asphalt-polymer mixture, cooling the asphalt-polymer mixture, grinding the cooled asphalt-polymer mixture to give a ground mixture, also referred to herein as a dry powder form of a PMA. For these solid processed polymer-modified asphalts, in one non-limiting embodiment, the proportion of particulate asphalt in the asphalt-polymer mixture ranges from about 70 wt % independently to about 98.5 wt %; alternatively from about 88 wt % independently to about 95 wt %. The proportion of polymer latex ranges in the asphalt-polymer mixture from about 1.5 wt % independently to about 30 wt %; alternatively from about 2.5 wt % independently to about 12 wt %. The ground mixture has a particle size distribution that is d50 of from about 1 independently to about 1000 microns; alternatively from about 10 independently to about 300 microns.

In another non-restrictive embodiment, the polymer modified asphalt emulsion may have a composition including about 40 wt % to about 75 wt % particulate polymer-modified asphalt, about 25 wt % to about 60 wt % water, and about 0.1 wt % to about 2.5 wt % emulsifier. Emulsifiers may be used to help keep the polymer-modified asphalt suspended in water. Suitable emulsifiers include, but are not necessarily limited to, tall oils, sodium lignosulfonates, alpha olefin sulfonates, ethoxylated nonyl phenols, polyethylene glycol tallow amines (including, but not necessarily limited to PEG-15 tallow amines), fatty amines, fatty amine and organic resin mixtures, amidoamines, hydrogenated tallow alkyl amines, soya alkyl amines, N-tall oil alkyltrimethylenediamines, polyethylene glycol tallow propylenedimonium dichlorides (including, but not necessarily limited to PEG-5 propylenedimonium dichloride, N-tallow alkyl tris(trimethylene)tetra amine, and combinations thereof.

In another non-limiting embodiment the particulate asphalt ranges in size from about 0.1 independently to about 20 microns in diameter; alternatively from about 0.5 independently to about 17 microns in diameter; in a different non-restrictive embodiment from about 1 independently to about 15 microns in diameter.

As noted, the methods of drilling through a subterranean formation with these drilling fluids also include controlling filtration, controlling lost circulation, preventing drill string differential sticking, stabilizing the wellbore, and/or controlling laminated or microfractured shale. In these further processes, the amount of polymer-modified asphalt in the drilling fluid is effective to increase at least one property of the drilling fluid as compared to an identical drilling fluid absent the polymer-modified asphalt, where the property includes, but is not necessarily limited to, filtration control, lost circulation control, drill string differential sticking prevention, wellbore stabilization and/or controlling laminated or microfractured shale, respectively. In one non-limiting embodiment, the proportion of polymer-modified asphalt in the drilling fluid ranges from about 1 pound per barrel (ppb) independently to about 15 ppb; alternatively, from about 2 ppb independently to about 6 ppb.

It is understood that in the practice of the compositions and methods described herein, the drilling fluid may also include any of the functional additives and components known to those of skill in the art, such as antioxidants, bentonites, barite, gums, water soluble polymers, viscosity modifying agents, breakers, emulsifiers, surfactants, thinners, circulation control additives, purified paraffins, isomerized olefins, salts for brine formation, and the like.

Additionally, while the compositions and methods have been illustrated by reference to water-based fluids and/or oil-based fluids, it is to be understood that the compositions and methods may also be used in emulsion fluids, particularly oil-in-water drilling fluids.

The invention will now be described with respect to certain Examples which are not intended to limit the invention in any way, but rather to further illuminate it with respect to certain non-limiting embodiments.

EXAMPLES 1-4

Solid asphaltite products and asphalt emulsions were compared to commercial drilling fluids additives in non-aqueous fluids.

Figure 2:
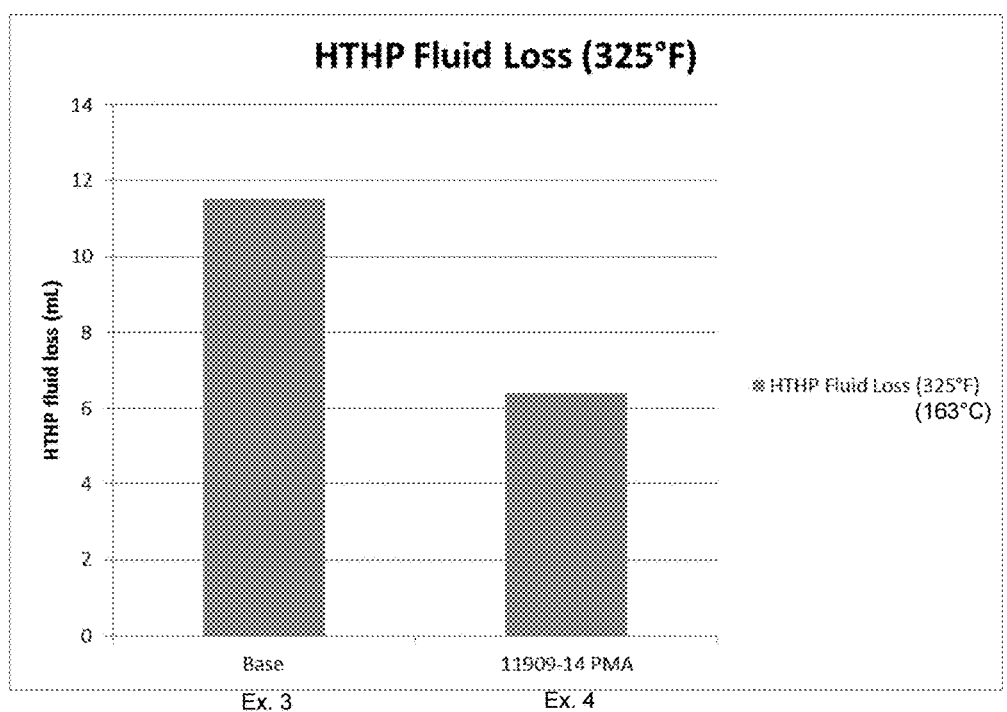
FIG. 2 is a graph comparing the HTHP fluid loss of the base fluid with the polymer-modified asphalt of FIG. 1 at 500 psid (3.4 MPa) and 325° F. (163° C.)

Cryogenically ground hard asphalt based polymer-modified asphalt (PMA) Sample A was tested for general performance in 15 ppg (1.8 kg/liter) diesel based fluids. Fluids were dynamic aged at both 300 and 325° F. (149 and 163° C., respectively) and tested for HTHP fluid loss at those respective temperatures, rheological properties and emulsion stability. Results are shown in Table I and Table II. Rheological properties and electrical stability (ES) values were similar in fluids both initially and after aging at 300 and 325° F. (149 and 163° C., respectively). HTHP values showed some interesting differences between the three samples compared to the base fluid and are highlighted in FIGS. 1 and 2. At 300° F. (149° C.) HTHP fluid loss values for the base fluid and Sample A (solid polymer modified asphalt) were 11.6 and 2.4 mL respectively. At 325° F. (163° C.) HTHP values for the base fluid and Sample A (solid polymer modified asphalt) were 11.5 and 6.4 mL, respectively. At both temperatures, solid PMA reduced fluid loss significantly.

TABLE I

Solid Asphalt Products in 15 ppg (1.8 kg/liter) OBM aged at 300° F. (149° C.)

| Components | Units | Ex. 1 Base | Ex. 2 PMA |
| --- | --- | --- | --- |
| Diesel Oil | ppb | 154.6 | 154.6 |
| Emulsifier | ppb | 13.0 | 13.0 |
| Organophilic clay | ppb | 4.0 | 4.0 |
| CaCl$_2$ Brine | ppb | 66.1 | 66.1 |
| Lime | ppb | 5.0 | 5.0 |
| Sample A Solid PMA | ppb |  | 5.0 |
| Barite | ppb | 384.1 | 384.1 |
| Initial Rheology |  |  |  |
| 600 | lb/100 ft$^2$ | 77 | 92 |
| 300 | lb/100 ft$^2$ | 45 | 56 |
| 200 | lb/100 ft$^2$ | 34 | 43 |
| 100 | lb/100 ft$^2$ | 23 | 28 |
| 6 | lb/100 ft$^2$ | 8 | 10 |
| 3 | lb/100 ft$^2$ | 7 | 9 |
| PV | cP | 32 | 36 |
| YP | lb/100 ft$^2$ | 13 | 20 |
| 10 sec | lb/100 ft$^2$ | 9 | 10 |
| 10 min | lb/100 ft$^2$ | 11 | 13 |
| Hot Roll Temp | ° F. (° C.) | 300 (149) | 300 (149) |
| 600 | lb/100 ft$^2$ | 80 | 83 |
| 300 | lb/100 ft$^2$ | 47 | 47 |
| 200 | lb/100 ft$^2$ | 35 | 34 |
| 100 | lb/100 ft$^2$ | 23 | 22 |
| 6 | lb/100 ft$^2$ | 9 | 8 |
| 3 | lb/100 ft$^2$ | 8 | 7 |
| PV | cP | 33 | 36 |
| YP | lb/100 ft$^2$ | 14 | 11 |
| 10 sec | lb/100 ft$^2$ | 11 | 11 |
| 10 min | lb/100 ft$^2$ | 18 | 21 |
| 30 min | lb/100 ft$^2$ | 21 | 23 |
| ES | Volts | 1145 | 1186 |
| HTHP Fluid Loss (300° F., 149° C.) | mL/30 min | 11.6 | 2.4 |

TABLE II

Solid Asphalt Products in 15 ppg (1.8 kg/liter) OBM aged at 325° F. (163° C.)

| Components | Units | Ex. 3 Base | Ex. 4 PMA |
| --- | --- | --- | --- |
| Diesel Oil | ppb | 154.6 | 154.6 |
| Emulsifier | ppb | 13.0 | 13.0 |
| Organophilic clay | ppb | 4.0 | 4.0 |
| CaCl$_2$ Brine | ppb | 66.1 | 66.1 |
| Lime | ppb | 5.0 | 5.0 |
| Solid PMA | ppb |  | 5.0 |
| Barite | ppb | 384.1 | 384.1 |
| Initial Rheology |  |  |  |
| 600 | lb/100 ft$^2$ | 81 | 85 |
| 300 | lb/100 ft$^2$ | 46 | 50 |
| 200 | lb/100 ft$^2$ | 31 | 38 |
| 100 | lb/100 ft$^2$ | 23 | 26 |
| 6 | lb/100 ft$^2$ | 9 | 10 |
| 3 | lb/100 ft$^2$ | 8 | 9 |
| PV | cP | 35 | 35 |
| YP | lb/100 ft$^2$ | 11 | 15 |
| 10 sec | lb/100 ft$^2$ | 9 | 10 |
| 10 min | lb/100 ft$^2$ | 11 | 13 |
| Hot Roll Temp | ° F. | 325 (163° C.) | 325 (163° C.) |
| 600 | lb/100 ft$^2$ | 85 | 105 |
| 300 | lb/100 ft$^2$ | 53 | 62 |
| 200 | lb/100 ft$^2$ | 41 | 47 |
| 100 | lb/100 ft$^2$ | 28 | 31 |
| 6 | lb/100 ft$^2$ | 12 | 12 |
| 3 | lb/100 ft$^2$ | 11 | 12 |
| PV | cP | 32 | 43 |
| YP | lb/100 ft$^2$ | 21 | 19 |
| 10 sec | lb/100 ft$^2$ | 15 | 18 |
| 10 min | lb/100 ft$^2$ | 24 | 28 |
| 30 min | lb/100 ft$^2$ | 27 | 31 |

TABLE II-continued

Solid Asphalt Products in 15 ppg (1.8 kg/liter) OBM aged at 325° F. (163° C.)

| Components | Units | Ex. 3 Base | Ex. 4 PMA |
|---|---|---|---|
| ES | Volts | 1043 | 1292 |
| HTHP Fluid Loss (325° F., 163° C.) | mL/30 min | 11.5 | 6.4 |

EXAMPLES 5-7

Slot Test Data

Asphalt products can be used in conjunction with conventional nut shell LCM products to seal interparticle pore space when bridging large fractures. Using a conventional package of sized calcium carbonate, synthetic graphite, pecan and walnut shell materials with a standard oil based mud, an automated permeability plugging apparatus with a 3 mm stainless steel slotted disc was used to simulate this effect.

Solid polymer modified asphalt Sample A, highly stabilized asphalt emulsion Sample B was used as a sealing agent at a concentration of 5 ppb (pounds per barrel; 14.25 kg/m$^3$) in conjunction with Walnut Shells Medium, Pecan Shells Coarse, Walnut Shells Coarse, synthetic graphite, and calcium carbonate fine, medium and coarse in 11.5 ppg (1.4 kg/liter) 80:20 oil water ratio, non-aqueous fluid.

Figure 3:
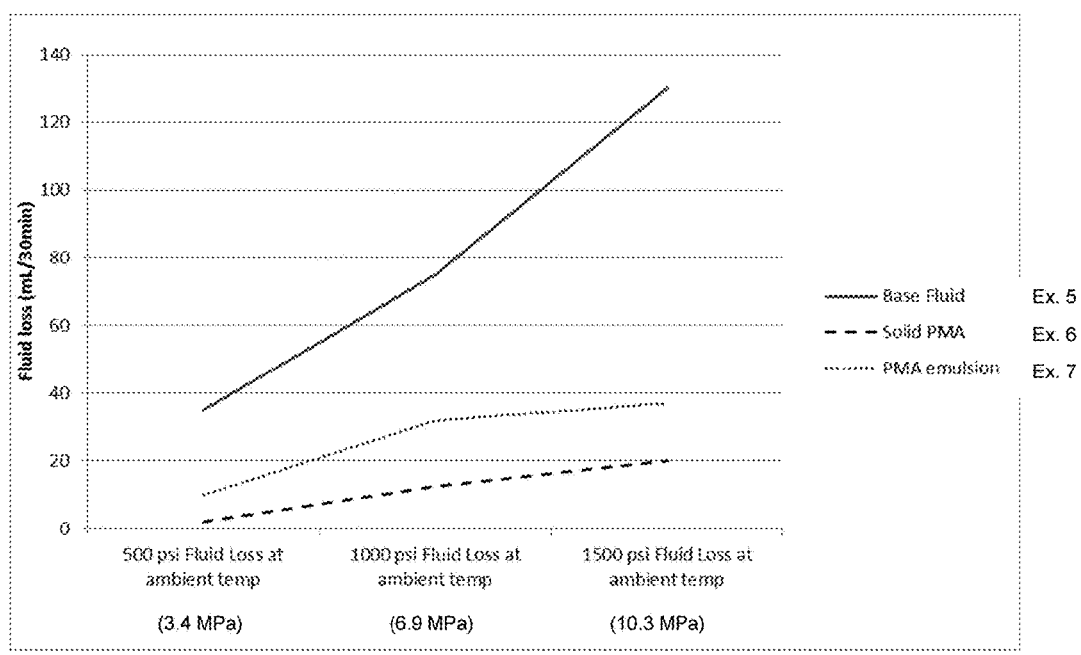
FIG. 3 is a graph presenting fluid loss comparison between lost circulation material (LCM) packages at 500, 1000, and 1500 psid (3.4, 6.9, and 10.3 MPa).

The fluid formulations were mixed on a Hamilton Beach Multi-mixer, and dynamically aged for 16 hours at 250° F. (121° C.). The fluids were then tested on a Fann Automated Permeability Plugging Apparatus (APPA) Model 389A at room temperature. The fractures were simulated using a stainless steel, 3 mm slotted disc. The test began by adding 500 psi (3.4 MPa) to the cell and monitoring the fluid output. If the pressure held for five minutes, the pressure was increased to 1,000 psi (6.9 MPa) and monitored. Again, if the pressure held for 5 minutes, the pressure was increased to 1,500 psi (10.3 MPa) and monitored. If the pressure held for 15 minutes at 1,500 psi (10.3 MPa), the test was considered a "pass," meaning the LCM material effectively sealed the 3 mm fracture. The test was a "fail" if the fluid flushed completely out of the cell at any point during the test. The fluid output was measured and recorded at pressure. Once the test was complete, the pressure was released and the cell was dismantled and cleaned. Results are shown in Table III and FIG. 3.

TABLE III

Asphalt Products with Conventional LCM Materials for Sealing and Bridging 3 mm Slotted Disc

| Components | Units | Ex. 5 Base Fluid | Ex. 6 Solid PMA | Ex. 7 PMA emulsion |
|---|---|---|---|---|
| Synthetic base oil | ppb | 167.48 | 167.48 | 167.48 |
| 20% CaCl$_2$ Brine | ppb | 71.13 | 71.13 | 71.13 |
| Emulsifier | ppb | 15 | 15 | 15 |
| Organophilic Clay | ppb | 4 | 4 | 4 |
| Barite | ppb | 176.89 | 176.89 | 176.89 |
| Calcium Carbonate Coarse | ppb | 18 | 18 | 18 |
| Calcium Carbonate Medium | ppb | 12 | 12 | 12 |
| Calcium Carbonate Fine | ppb | 14 | 14 | 14 |
| Synthetic Graphite | ppb | 4.5 | 4.5 | 4.5 |
| Pecan Shells Medium | ppb | 5 | 5 | 5 |
| Pecan Shells Coarse | ppb | 20 | 20 | 20 |
| Walnut Shells Coarse | ppb | 10 | 10 | 10 |
| Sample B Liquid PMA Emulsion | ppb | | | 5 |
| Sample A Solid Polymer Modified Asphalt | ppb | | 5 | |
| Hot Roll Temperature (121° C.) | F. | 250 | 250 | 250 |
| PPA Testing with 3 mm stainless steel slotted disc | | | | |
| 500 psi (3.4 MPa) fluid loss at ambient temp | mL/30 min | 35 | 2 | 10 |
| 1000 psi (6.9 MPa) fluid loss at ambient temp | mL/30 min | 75 | 12.5 | 32 |
| 1500 psi (10.3 MPa) fluid loss at ambient temp | mL/30 min | 130 | 20 | 37 |

In the foregoing specification, the invention has been described with reference to specific embodiments thereof, and has been suggested as effective in providing effective methods and compositions for providing drilling fluids for boring in wellbores and subterranean reservoirs and formations which fluids contain polymer-modified asphalts. However, it will be evident that various modifications and changes may be made thereto without departing from the broader spirit or scope of the invention. Accordingly, the specification is to be regarded in an illustrative rather than a restrictive sense. For example, specific combinations of components for forming the drilling fluids, such as particulate asphalts, polymers, reactants to provide the polymers with certain functional groups, emulsifiers, surfactants, other additives and proportions thereof falling within the claimed parameters, but not specifically identified or tried in a particular fluid to improve the lubricity as described herein, are anticipated to be within the scope of this invention. Furthermore, drilling fluid properties other than those specifically discussed herein may also be improved.

The present invention may suitably comprise, consist or consist essentially of the elements disclosed and may be practiced in the absence of an element not disclosed. For example, the method of drilling through a subterranean formation may comprise, consist essentially of or consist of drilling through a subterranean formation with a drilling fluid comprising, consisting essentially of or consist of water and a polymer-modified asphalt dispersed in the water which in turn comprises, consists essentially of or consists of particulate asphalt and a polymer latex.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (a g., it includes the degree of error associated with measurement of the given parameter).

What is claimed is:

1. A method of drilling through a subterranean formation comprising:
   drilling through the subterranean formation with a drilling fluid comprising:
      a water-based base fluid; and
      a polymer-modified asphalt dispersed in the base fluid, the polymer-modified asphalt comprising:
         particulate asphalt; and
         a polymer latex;
   where the polymer latex is selected from the group consisting of polyethylene, polypropylene, ethylene-vinyl-acetate, ethylene-methacrylate, styrene-butadiene block copolymer, styrene-butadiene rubber, styrene-isoprene block copolymer, ethylene-propylene-diene-monomer, epoxy resins, natural rubber, polybutadiene, polyisoprene, reclaimed tire rubber, crumb rubber modifiers, acrylonitrile-butadiene-styrene, isoprene, reactive-ethylene-terpolymers, polyvinyl chloride, ethylene-acrylate copolymer, acrylates, ethyl-methacrylate, ethyl-butyl-acrylate, butyl rubber, polychloroprene, styrene-ethylene/butylene-styrene, polychloroprene, natural rubber latex (NRL), ethylene/glycidyl/acrylate (EGA), and combinations thereof; and
   further where the selected polymer latex is functionalized to react with the particulate asphalt, and functionalization is selected from the group consisting of
      reacting the selected polymer latex with a sulfonate to sulfonate the selected polymer latex;
      copolymerizing the selected polymer latex with a polyethylene containing epoxy rings; and
      combinations thereof.

2. The method of claim 1 where the functionalized polymer latex has an overall anionic charge.

3. The method of claim 1 where:
   the polymer modified asphalt comprises an emulsion of polymer-modified asphalt particles; and
   the proportion of particulate asphalt to polymer latex in the polymer-modified asphalt ranges from:
      about 40 wt % to about 75 wt % asphalt; and
      about 1.5 wt % to about 15 wt % polymer.

4. The method of claim 3 where particle size distribution of the polymer-modified asphalt particles in the emulsion is d50 of about 0.100 to about 100 microns.

5. The method of claim 1 where the polymer-modified asphalt is made by a process comprising:
   melting a solid asphalt;
   shearing the melted asphalt while adding dry polymer particles to give an asphalt-polymer mixture;
   cooling the asphalt-polymer mixture;
   grinding the cooled asphalt-polymer mixture to give a ground mixture of polymer modified asphalt; and
   where:
      the proportion of asphalt in the asphalt-polymer mixture ranges from about 70 wt % to about 98.5 wt %; and
      the proportion of polymer latex ranges in the asphalt-polymer mixture from about 1.5 wt % to about 30 wt %.

6. The method of claim 5 where the ground mixture has a particle size distribution of d50 of about 1 to about 1000 microns.

7. The method of claim 1 where the polymer modified asphalt comprises an emulsion and further comprises an emulsifier, the base fluid is water, and the polymer modified asphalt emulsion comprises:
   about 40 wt % to about 75 wt % particulate polymer-modified asphalt;
   about 25 wt % to about 60 wt % water; and
   about 0.1 wt % to about 2.5 wt % emulsifier.

8. The method of claim 7 where the emulsifier is selected from the group consisting of tall oils, sodium lignosulfonates, alpha olefin sulfonates, ethoxylated nonyl phenols, polyethylene glycol tallow amines, fatty amines, fatty amine and organic resin mixtures, amidoamines, hydrogenated tallow alkyl amines, soya alkyl amines, N-tall oil alkyltrimethylenediamines, polyethylene glycol tallow propylenedimonium dichlorides, N-tallow alkyl tris(trimethylene)tetra amine, and combinations thereof.

9. The method of claim 1 where the particulate asphalt ranges in size from about 0.1 to about 20 microns in diameter.

10. The method of claim 1 where the method further comprises a process selected from the group consisting of:
    controlling filtration,
    controlling lost circulation,
    preventing drill string differential sticking,
    stabilizing a wellbore, and
    controlling laminated or microfractured shale;
and where the amount of polymer-modified asphalt in the drilling fluid is effective to increase at least one property of the drilling fluid as compared to an identical drilling fluid absent the polymer-modified asphalt, where the at least one property is selected from the group consisting of:
    filtration control,
    lost circulation control,
    drill string differential sticking prevention,
    wellbore stabilization, and
    controlling laminated or microfractured shale, respectively to each process.

11. A method of drilling through a subterranean formation comprising:
    drilling through the subterranean formation with a drilling fluid comprising:

a base fluid selected from the group consisting of water-based fluids, oil-based fluids, and combinations thereof; and a polymer-modified asphalt dispersed in the base fluid comprising:

particulate asphalt ranging in size from 0.1 to 20 microns in diameter; and a polymer latex selected from the group consisting of polyethylene (PE), polypropylene (PP), ethylene-vinyl-acetate (EVA), ethylene-methacrylate (EMA), styrene-butadiene block copolymer (SBS), Zn-sulfonated-SBS, styrene-butadiene rubber (SBR), styrene-isoprene block copolymer (SIS), ethylene-propylene-diene-monomer (EPDM), epoxy resins, natural rubber, polybutadiene (PB), polyisoprene, reclaimed tire rubber, crumb rubber modifiers (CRM), acrylonitrile-butadiene-styrene (ABS), isoprene, reactive-ethylene-terpolymers (RET), polyvinyl chloride (PVC), ethylene-acrylate copolymer, acrylates, ethyl-methacrylate (EMA), ethyl-butyl-acrylate (EBA), butyl rubber, polychloroprene, styrene-ethylene/butylene-styrene (SEBS), polychloroprene (Neoprene), natural rubber latex (NRL), ethylene/glycidyl/acrylate (EGA), and combinations thereof;

further where the selected polymer latex is functionalized to react with the particulate asphalt, and functionalization is selected from the group consisting of reacting the selected polymer latex with a sulfonate to sulfonate the selected polymer latex;

copolymerizing the selected polymer latex with a polyethylene containing epoxy rings; and combinations thereof;

where the functionalized polymer latex has increased dispersability as compared with a polymer latex that is not functionalized.

12. The method of claim 11 where:

the polymer-modified asphalt comprises an emulsion of polymer-modified asphalt particles; and the proportion of particulate asphalt to polymer latex in the polymer-modified asphalt ranges from:

about 40 wt % to about 75 wt % asphalt; and about 1.5 wt % to about 15 wt % polymer.

13. The method of claim 12 where particle size distribution of the polymer-modified asphalt particles in the emulsion is d50 of about 0.100 to about 100 microns.

14. A method of drilling through a subterranean formation comprising:

drilling through a subterranean formation with a drilling fluid comprising:

a water-based base fluid; and a polymer-modified asphalt dispersed in the base fluid comprising:

about 25 wt % to about 60 wt % water; and about 40 wt % to about 75 wt % polymer-modified asphalt dispersed in the water comprising:

particulate asphalt ranging in size from 0.1 to 20 microns in diameter; and a polymer latex; and about 0.1 wt % to about 2.5 wt % emulsifier;

where the polymer latex is selected from the group consisting of polyethylene (PE), polypropylene (PP), ethylene-vinyl-acetate (EVA), ethylene-methacrylate (EMA), styrene-butadiene block copolymer (SBS), Zn-sulfonated-SBS, styrene-butadiene rubber (SBR), styrene-isoprene block copolymer (SIS), ethylene-propylene-diene-monomer (EPDM), epoxy resins, natural rubber, polybutadiene (PB), polyisoprene, reclaimed tire rubber, crumb rubber modifiers (CRM), acrylonitrile-butadiene-styrene (ABS), isoprene, reactive-ethylene-terpolymers (RET), polyvinyl chloride (PVC), ethylene-acrylate copolymer, acrylates, ethyl-methacrylate (EMA), ethyl-butyl-acrylate (EBA), butyl rubber, polychloroprene, styrene-ethylene/butylene-styrene (SEBS), polychloroprene (Neoprene), natural rubber latex (NRL), ethylene/glycidyl/acrylate (EGA), and combinations thereof; and further where the selected polymer latex is functionalized to react with the particulate asphalt, and functionalization is selected from the group consisting of reacting the selected polymer latex with a sulfonate to sulfonate the selected polymer latex;

copolymerizing the selected polymer latex with a polyethylene containing epoxy rings; and combinations thereof;

where the functionalized polymer latex has increased dispersability as compared with a polymer latex that is not functionalized.

15. The method of claim 14 where the emulsifier is selected from the group consisting of tall oil, sodium lignosulfonate, alpha olefin sulfonate, ethoxylated nonyl phenol, polyethylene glycol tallow amines, fatty amines, fatty amine and organic resins mixture, amidoamine, hydrogenated tallow alkyl amines, soya alkyl amines, N-tall oil alkyltrimethylenediamines, polyethylene glycol tallow propylenedimonium dichloride, N-tallow alkyl tris(trimethylene)tetra amine, and combinations thereof.

16. The method of claim 14 where the polymer modified asphalt is made by a process comprising:

melting a solid asphalt;

shearing the melted asphalt while adding dry polymer particles to give an asphalt-polymer mixture;

cooling the asphalt-polymer mixture;

grinding the cooled asphalt-polymer mixture to give a ground mixture of polymer modified asphalt; and where the proportion of asphalt in the asphalt-polymer mixture ranges from about 70 wt % to about 98.5 wt %; and the proportion of polymer latex ranges in the asphalt-polymer mixture from about 1.5 wt % to about 30 wt %.

* * * * *